(12) United States Patent
Velez

(10) Patent No.: US 10,960,528 B1
(45) Date of Patent: Mar. 30, 2021

(54) MOTORIZED MULTI-FUNCTION TOOL

(71) Applicant: MIRA SMART INVESTMENT, LLC, Naples, FL (US)

(72) Inventor: Rafael Velez, Naples, FL (US)

(*) Notice: Subject to any disclaimer, the term of this patent is extended or adjusted under 35 U.S.C. 154(b) by 0 days.

(21) Appl. No.: 16/743,075

(22) Filed: Jan. 15, 2020

(51) Int. Cl.
| | |
|---|---|
| *B25F 3/00* | (2006.01) |
| *A01D 34/78* | (2006.01) |
| *A01D 34/82* | (2006.01) |
| *B08B 1/04* | (2006.01) |
| *B25F 5/02* | (2006.01) |
| *A47L 9/32* | (2006.01) |
| *B24B 23/02* | (2006.01) |
| *B25F 1/02* | (2006.01) |
| *A47L 9/04* | (2006.01) |

(52) U.S. Cl.
CPC ............... *B25F 3/00* (2013.01); *A01D 34/78* (2013.01); *A01D 34/824* (2013.01); *A47L 9/0411* (2013.01); *A47L 9/322* (2013.01); *B08B 1/04* (2013.01); *B24B 23/02* (2013.01); *B25F 1/02* (2013.01); *B25F 5/02* (2013.01)

(58) Field of Classification Search
None
See application file for complete search history.

(56) References Cited

U.S. PATENT DOCUMENTS

| | | | |
|---|---|---|---|
| 4,089,114 A | 5/1978 | Doolittle et al. | |
| 4,237,610 A | 12/1980 | Bradus et al. | |
| 6,651,347 B2 * | 11/2003 | Uhl | A01G 3/08 30/272.1 |
| 9,955,627 B2 * | 5/2018 | Nakano | A01D 34/828 |
| 2008/0092311 A1 * | 4/2008 | Munn | A46B 13/001 15/28 |
| 2008/0189870 A1 * | 8/2008 | Dayton | B23D 51/16 7/167 |

* cited by examiner

*Primary Examiner* — Brian D Keller
(74) *Attorney, Agent, or Firm* — Sanchelima & Associates, P.A.; Christian Sanchelima; Jesus Sanchelima

(57) ABSTRACT

A motorized multi-function tool including a handle assembly, a cover assembly, a rod assembly and an interchangeable tool assembly is disclosed. The handle assembly includes a handle that allows a user to operate the motorized multi-function tool. Within the handle is a battery to power a motor located in the cover assembly. The handle assembly and the cover assembly have the rod assembly therebetween connecting them to one another. The rod assembly includes a shaft which allows the user to set the motorized multi-function tool at different lengths to accomplish distinct tasks. Importantly, the cover assembly has the interchange tool assembly which allow for changing of tool heads for different functions to accomplish different tasks. The different tool heads may be used for manual labor work or for health and beauty purposes as well.

12 Claims, 9 Drawing Sheets

MOTORIZED MULTI-FUNCTION TOOL

BACKGROUND OF THE INVENTION

1. Field of the Invention

The present invention relates to a motorized multi-function tool and, more particularly, to a motorized multi-function tool having interchangeable heads to permit completing of various tasks with one same tool.

2. Description of the Related Art

Several designs for motorized multi-function tools have been designed in the past. None of them, however, include an interchangeable cover assembly having a head that includes a motor therein. The heads are capable of achieving various tasks such as cutting or suctioning, for example. This allows a user to use one same tool to complete various necessary tasks at home or in a work environment. Further, there is a quick and easy change of heads for efficiency when working on various tasks.

Applicant believes that a related reference corresponds to U.S. Pat. No. 4,237,610 for a Portable, Electrically Energized, Cordless Grass Trimmer. Applicant believes another related reference corresponds to U.S. Pat. No. 4,089,114 for a Cutting Device. None of these references, however, teach of interchangeable heads for accomplishing various tasks such as cutting or suctioning with one same tool.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motorized multi-function tool that has interchangeable heads.

It is another object of this invention to provide a motorized multi-function tool that is capable of multiple functions such as cutting, brushing, buffing or suctioning, for example.

It is still another object of the present invention to provide a motorized multi-function tool that is portable.

It is another object of the present invention to provide a motorized multi-function tool that can complete various tasks quickly.

It is also another object of the present invention to provide a motorized multi-function tool that is easy to operate.

It is yet another object of the present invention to provide a motorized multi-function tool that can help users reach hard to reach areas.

It is another object of the present invention to provide a motorized multi-function tool that allows for quick and easy changing of the interchangeable heads.

It is still another object of the present invention to provide a motorized multifunction tool that helps users address their cosmetic needs and concerns.

It is also an object of the present invention to provide a motorized multifunction tool that helps users improve their well-being.

It is another object of the present invention to provide a motorized multi-function tool that can be operated single handedly, permitting the user to better secure themselves to a location or object with their free hand for added safety.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
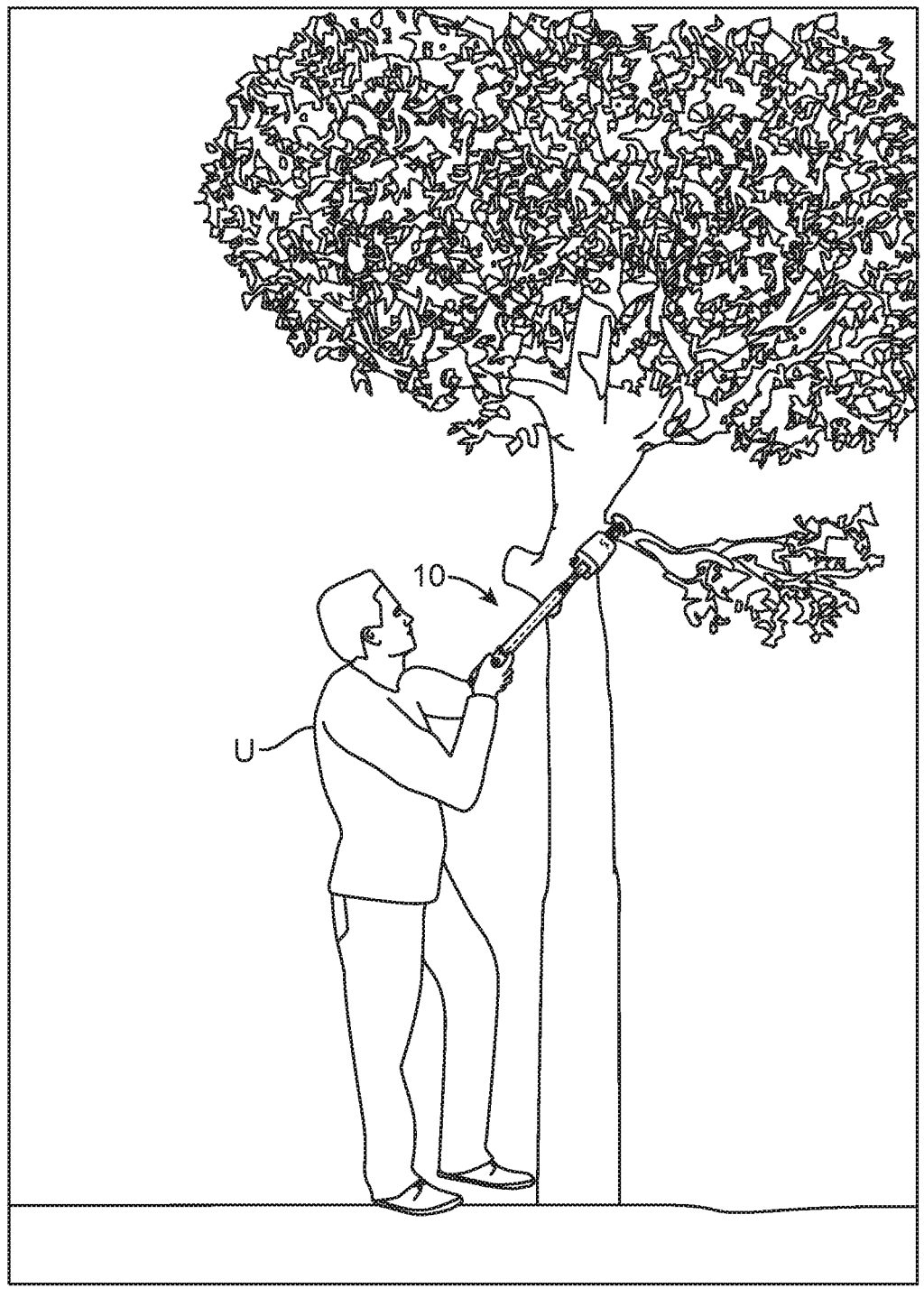
FIG. 1 represents the present invention, a motorized multi-function tool 10, in an operational setting.
Figure 2:
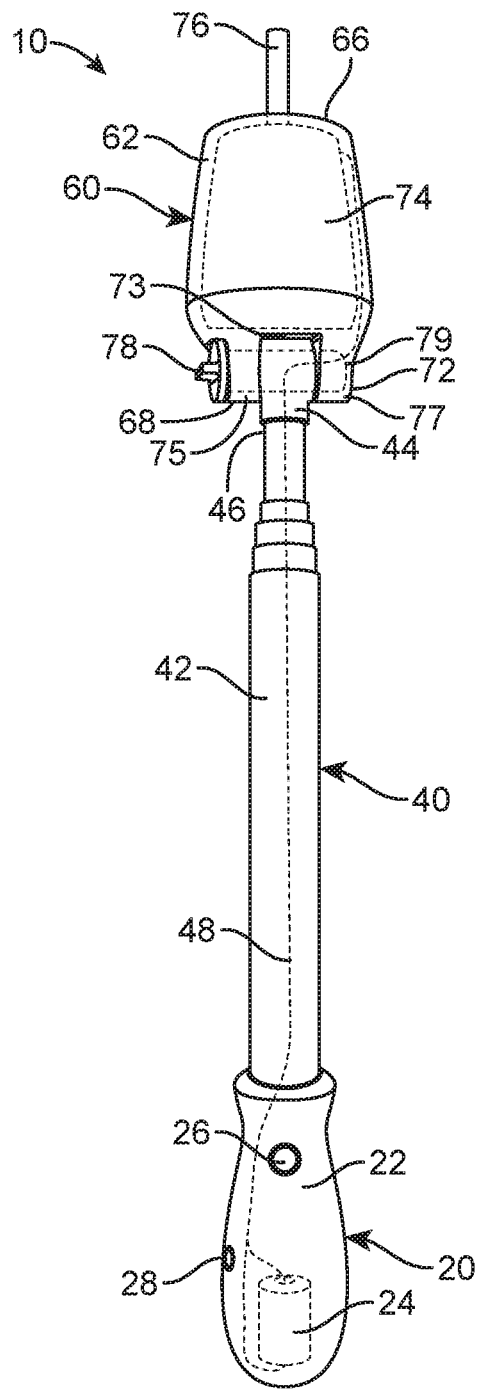
FIG. 2 shows an isometric view of the motorized multi-function tool 10 in a retracted configuration.
Figure 3:
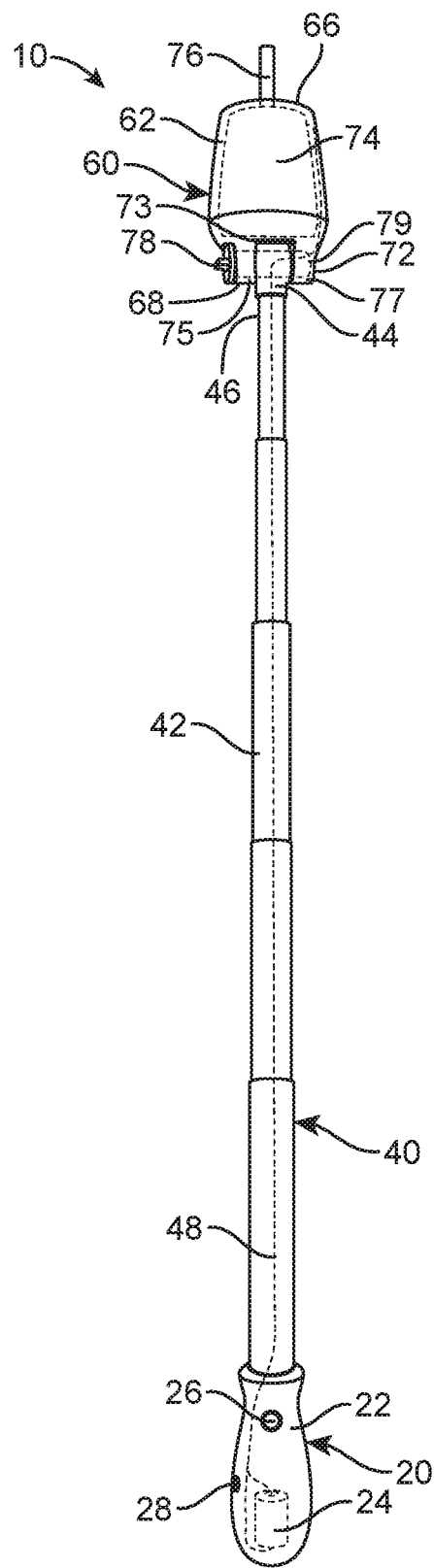
FIG. 3 illustrates an isometric view of the motorized multi-function tool 10 in an extended configuration.
Figure 4:
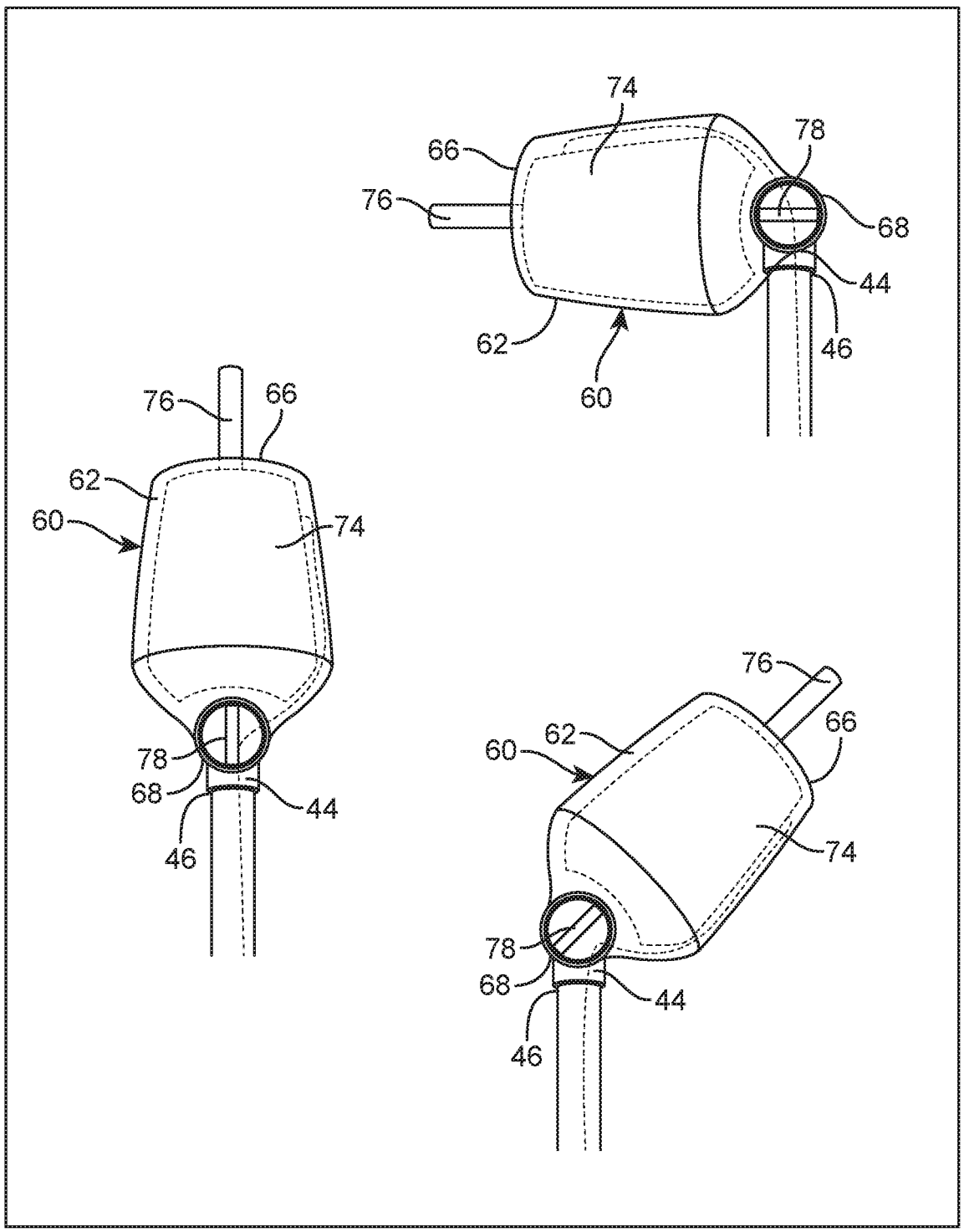
FIG. 4 shows how the cover assembly 60 can be positioned or angled differently to help accomplish tasks that may require inconvenient working angles.

Referring now to the drawings, where the present invention is generally referred to with numeral 10, it can be observed that it, a motorized multi-function tool 10, basically includes a handle assembly 20, a rod assembly 40, a cover assembly 60 and an interchangeable tool assembly 80.

Motorized multi-function tool 10 may be used to accomplish various and different tasks with one same tool by having interchangeable tool heads. Motorized multi-function tool 10 includes handle assembly 20. Handle assembly 20 includes a handle 22 which may be adapted to allow a user U to grasp handle 22 and operate or maneuver the present invention. Handle 22 may be of a predetermined shape that is ergonomic for comfortably receiving a hand of user U. Handle 22 may be made of plastic, rubber, or virtually any other material. Housed in handle 22 may be a battery 24 for providing power to various components of the present invention. Preferably, battery 24 may be rechargeable. In one embodiment, battery 24 may be removable for purposes of recharging or replacing of battery 24. It may be suitable for handle assembly 20 to include a charging port 28 on handle 22 to allow for recharging of battery 22. Further included in handle assembly 20 may be a power button 26 to accentuate a motor 74 located within cover assembly 60. Power button 26 may be operated to turn on and off components of the present invention.

Motorized multi-function tool 10 may include rod assembly 40 mounted on handle assembly 20. Rod assembly 40 may be used to allow extending or retracting of the present invention to reach different heights to accomplish different tasks or needs. Rod assembly 40 may include a shaft 42. In one embodiment, shaft 42 may be telescopic. Shaft 42 may extend or retract to lengthen or shorten the present invention to be able to reach a desired height or distance. Shaft 42 being telescopic may allow for user U to use and operate the present invention even with limited mobility. Shaft 42 may be of predetermined dimensions. In one embodiment, shaft 42 may be cylindrical. However, it should be understood that any shape may be suitable for shaft 42. Shaft 42 may preferably be made of aluminum or stainless steel as to be durable yet lightweight, but any other material may be suitable. Shaft 42 may include a male member 44 extending from a top end 46 of shaft 42. Male member 44 may be open on both lateral sides. Extending through shaft 42 may be a power cable 48 which connects to battery 24 on one end and to motor 74 on an opposite end. Power cable 48 allows for power from battery 24 to reach motor 74 in order for motor 74 to operate. In an alternate embodiment, motor 74 may vibrate or shake when needed by user U. The vibration may aid in the usage of certain tools with the present invention, preferably with tools intended for health and beauty purposes.

Figure 8:
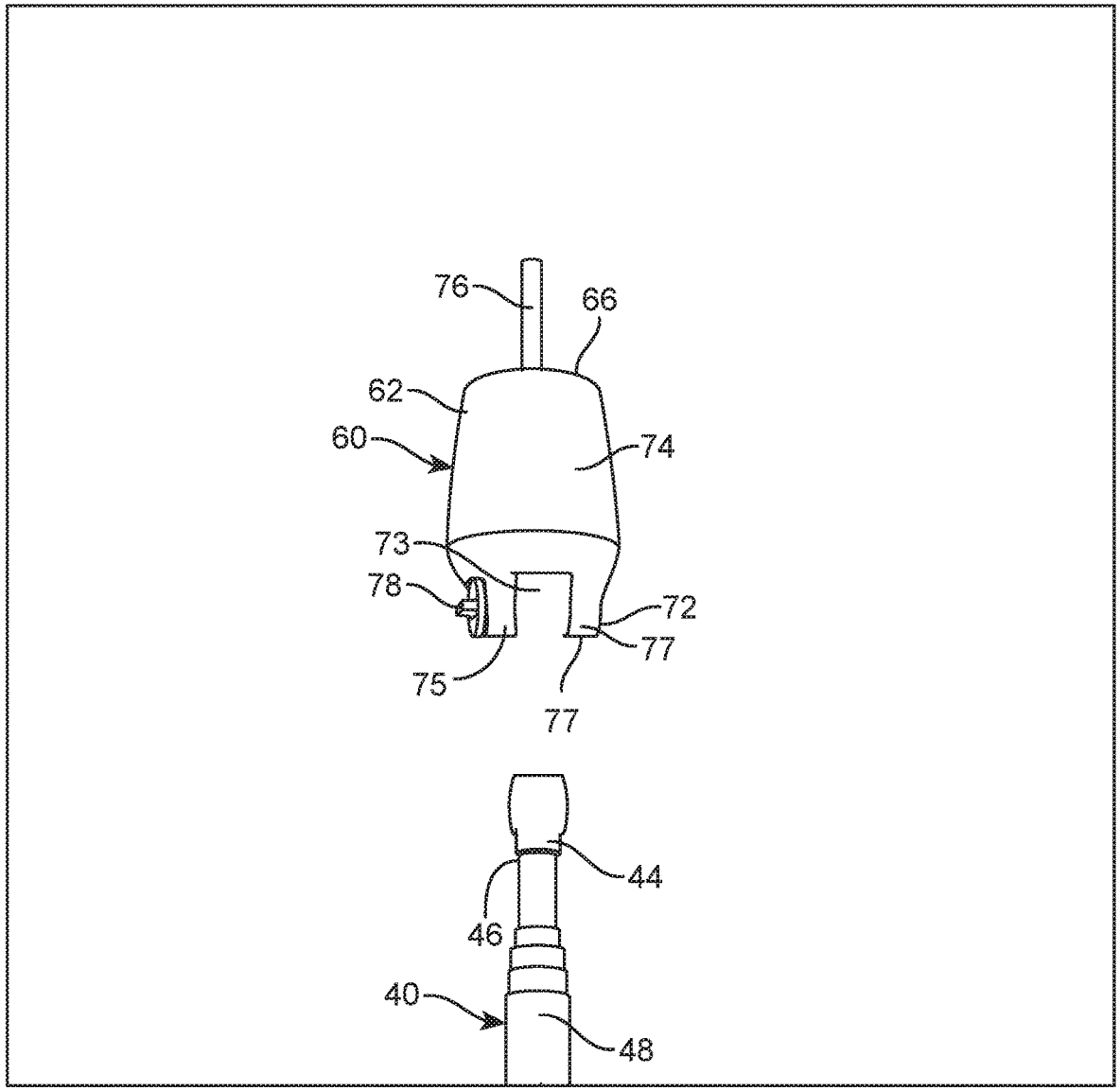
FIG. 8 shows the rod assembly 40 and the cover assembly 60 separated.

The present invention may further include cover assembly 60 mounted to rod assembly 40. Rod assembly 40 and cover assembly 60 may be seen before mounting together in FIG. 8. Cover assembly 60 may importantly include a head 62. Head 62 may have an opening at a first end 66 of head 62 leading to an interior of head 62. Head 62 may further include a second end 68 at which a female member 72 may be mounted to. In one embodiment, head 62 may be tapered. Female member 72 may include a female opening 73 defined as the space therebetween a first female side 75 and a second female side 77. Each of first female side 75 and second female side 77 may be entirely open on lateral sides. Female member 72 may receive male member 44 within female opening 73. Once male member 44 has been received within female member 72, a fastener 79 may extend perpendicularly to male member 44 and female member 72. Male member 44 and female member 72 are held and secured together by fastener 79 which extends through the lateral openings of male member 44 and female member 72. At one end of fastener 79 may be a tightening knob 78 mounted thereon. Tightening knob 78 may be an outwardly protruding knob that allows for positioning of head 62 relative to shaft 42. In order to allow for positioning of head 62 tightening knob may be rotated in a predetermine direction that loosens male member 44 and female member 72. Once tightening knob 78 has been loosened a sufficient amount, head 62 may freely move into position. Tightening knob 78 may also be adapted to receive fingers of user U to rotatably move and position head 62 as desired by user U. With male member 44 and female member 72 being secured together, head 62 may still be movable. Once the desired position of head 62 has been achieved, then tightening knob 78 may be rotated in a predetermine direction that tightens and secures head 62 into the desired position. Once tightening knob 78 has been fully tightened then head 62 may no longer freely move. Importantly extending from motor 74 may be an axle 76. Axle 76 may be of predetermined dimensions. Axle 76 may be adapted to receive tools or heads from interchangeable tool assembly 80. Axle 76 may be actuated upon motor 74 being actuated. In one embodiment, axle 76 may freely rotate as motor 74 is being powered by battery 24. Motor 74 may be housed within head 62. In one embodiment, motor 74 may be housed within head 62 through the opening at first end 66. Axle 76 may protrude and extend from head 62. Axle 76 may further receive an attaching portion 94 of interchangeable tool assembly 80. Attaching portion 94 may be fully received by and within axle 76. Attaching portion 94 aids in securing a tool from interchangeable tool assembly 80 to axle 76.

Figure 5:
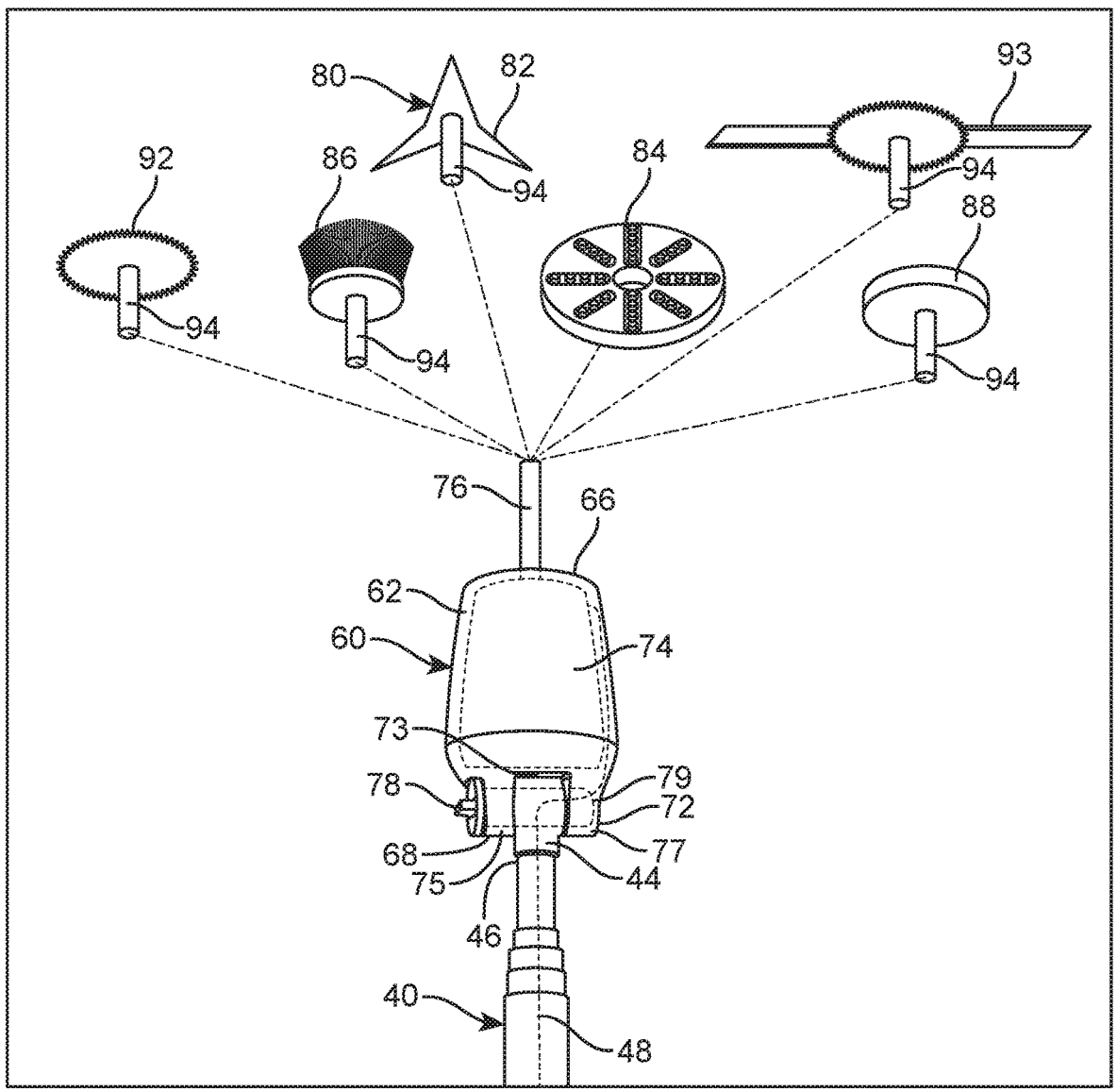
FIG. 5 is a representation of the tool heads 81 of the interchangeable tool assembly 80.
Figure 6:
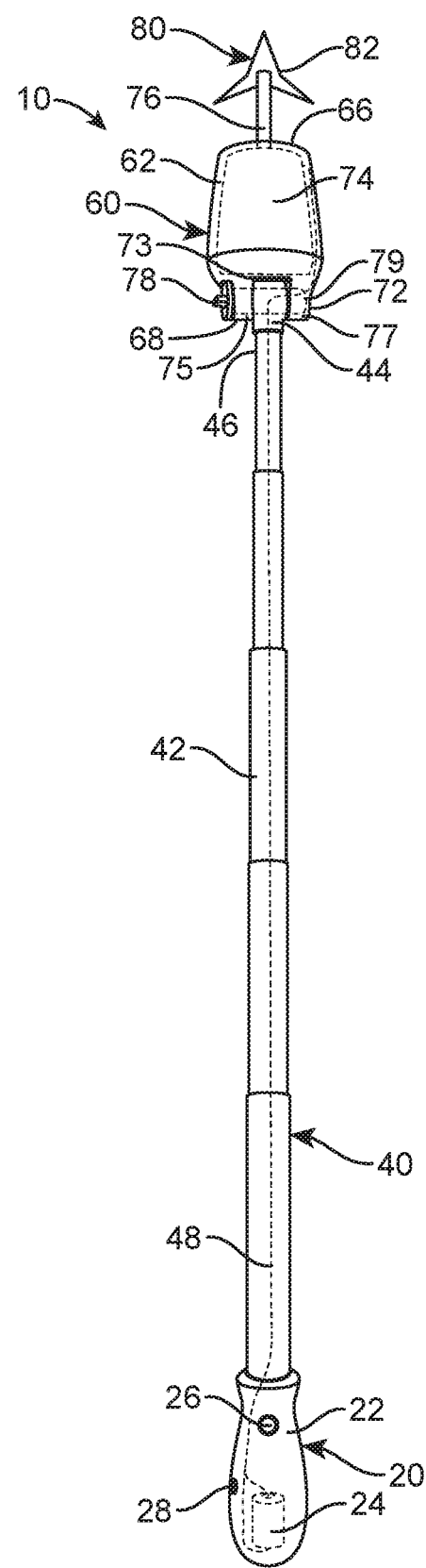
FIG. 6 shows one of the tool heads 81, the triangular cutter tool 82, mounted to the present invention.

Mounted to motor 74 and more specifically to axle 76 may importantly be interchangeable tool assembly 80 as seen in FIG. 5. Interchangeable tool assembly 80 may include different tool heads 81 to be used to accomplish different tasks with one same tool. Interchangeable tool assembly 80 may include tool heads 81 which are one of a triangular cutter tool 82, a vacuum tool 84, a brush tool 86, a buffer tool 88, a round cutter tool 92, and a twin blade cutter tool 93. It may be appreciated and understood that tool heads beyond those disclosed may be suitable to use with the present invention. Each of the aforementioned tools may include attaching portion 94 for securing the tools to axle 76. In one embodiment, triangular cutter tool 82 may include three triangular blades for ease of cutting items such as branches, for example. In one embodiment, vacuum tool 84 may be circular shaped. Vacuum tool 84 may be actuated to clean up and suction debris or dirt. Vacuum tool 84 may further include small bristles for dislodging debris for ease of suctioning afterwards. The small bristles of vacuum tool 84 may be oriented in a star like configuration. Brush tool 86 may include a plurality of bristles thereon for cleaning or the like of surfaces. In one embodiment, brush tool 86 may be preferably circular shaped. In one embodiment, buffer tool 88 may be preferably be circular and used to polish a surface or the like. Round cutter tool 92 may be adapted cut. Round cutter tool 92 may include a plurality of blades along an outer circumference. Twin blade cutter tool 93 may include a circular disk with blades protruding along an outer circumference. Twin blade cutter tool 92 may also include twin blades extending from the circular disk. Each of the twin blades may be sharp only on one side. The twin blades are oriented opposite to one another so that the sharp side of each of the twin blades face opposite to one another. As user U needs different and at times various tools to accomplish a task. Any of triangular cutter tool 82, vacuum tool 84, brush tool 86, buffer tool 88, round cutter tool 92 or twin blade cutter tool 93 may be attached and later removed from axle 76. For example, if user U needs to make cuts to a wooden surface, user U may attach triangular cutter tool 82 to axle 76 for cutting. Once all cutting has been completed, user U may detach triangular cutter tool 82 and replace it with vacuum tool 84 for cleaning up of debris that resulted from cutting with triangular cutter tool 82. It should be understood that tools beyond those described may be suitable to use with the present invention.

Figure 7:
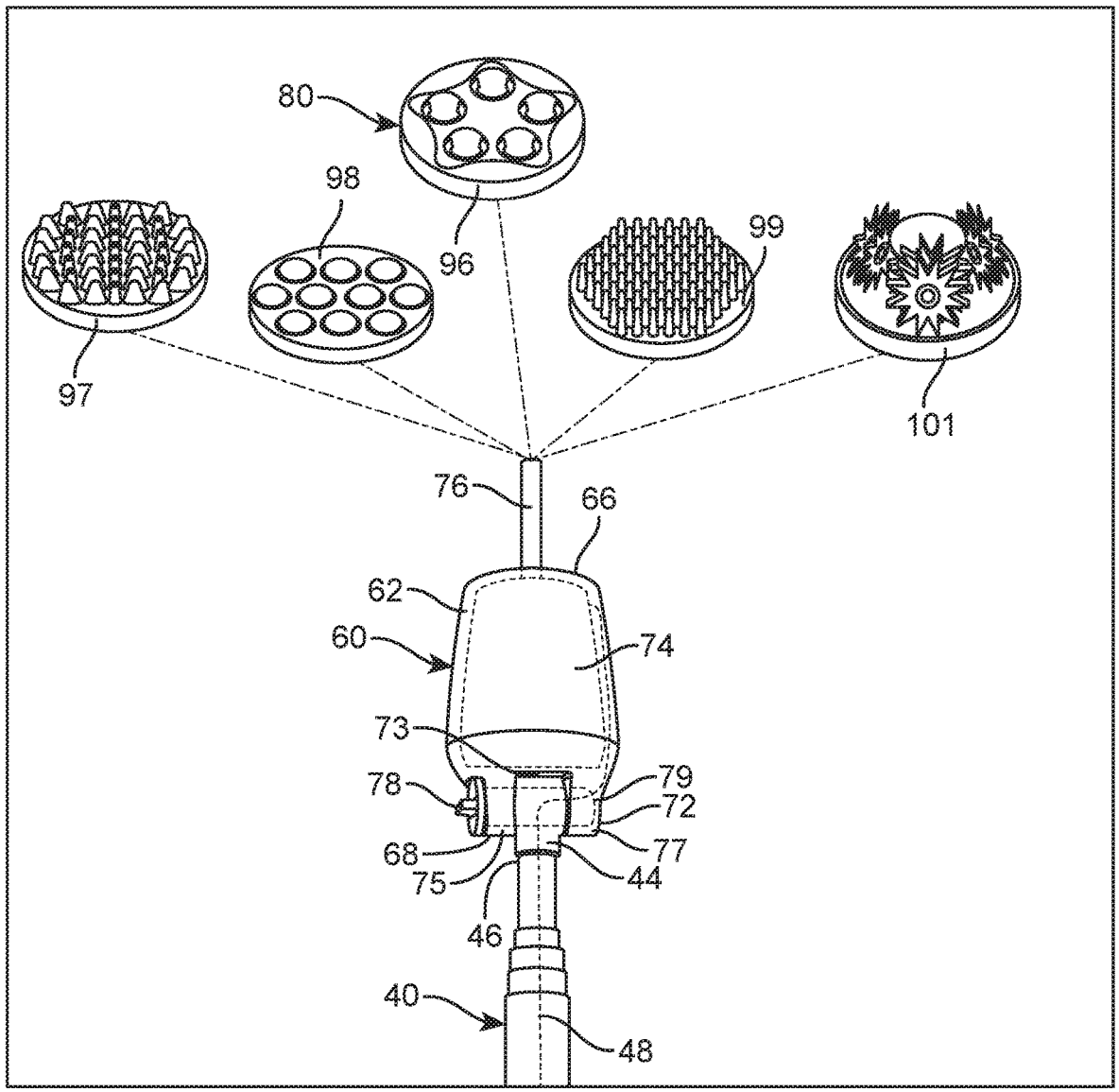
FIG. 7 illustrates additional interchangeable heads, beauty tool heads 95, of the present invention that may be used for health care and beauty care purposes of a user.

Referring to FIG. 7 it can be seen that the present invention may further include beauty tool heads 95 that may be used for health or cosmetic purposes. Beauty tool heads 95 depicted help user U may take care of aesthetic, cosmetic or beauty concerns. Beauty tool heads 95 may further aid user U address their wellbeing or health needs and concerns. The following beauty tool heads 95 may provide muscle relief to the user or help to improve blood circulation in user U. Beauty tool heads 95 may further be used for relaxation and massages for user U. Additionally, beauty tool heads 95 described may help with cellulite, spider veins, redness, varicose veins, or other skin concerns. It may be suitable to also exfoliate the skin of user U with beauty tool heads 95. It can be seen that beauty tool heads 95 include a ball head 96, a large spikes head 97, a massage head 98, a small spikes head 99 and a rolling spikes head 101. Each of beauty tool heads 95 may be interchangeable and removably be mounted to motor 94. It may be suitable for motor 94 to vibrate or shake, in one embodiment. The vibrations of motor 94 may allow for treatments with beauty tool heads 95 to be more effective. Ball head 96 may include a plurality of balls that may roll in place during usage. Large spikes head 97 and small spikes head 99 may include a plurality of protruding spikes that may be used to relieve pain or pressure. The spikes may be used to hit tension points in muscles for relief. Massage head 98 may include a plurality of rounded bumps or protrusions that may be used to massage the muscles or scalp of user U. Rolling spikes head 101 may include a plurality of spikes that are pointy and rotate. This may help to relieve muscles of user U. It should be understood that beauty tool heads 95 may include additional beauty tools that may aid in increasing or improving the wellness and beauty of user U.

Figure 9:
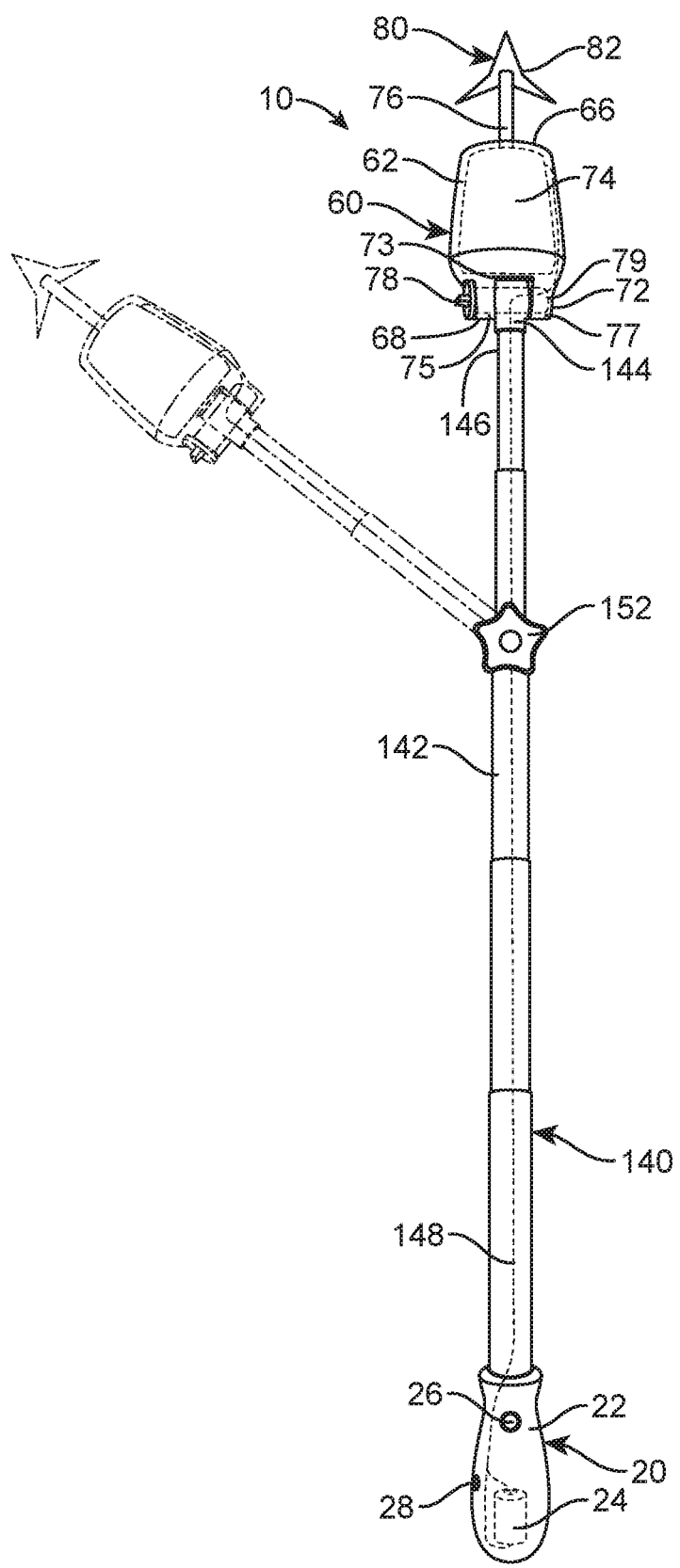
FIG. 9 represents an alternate embodiment of the shaft assembly 140, wherein the shaft 142 includes a pivot knob 152 that allows the shaft 142 to swivel or to be articulated about the location of the pivot knob 152 allowing the present invention to reach laterally and hard to reach areas.

In an alternate embodiment, as seen in FIG. 9, the present invention may include a shaft assembly 140. Shaft assembly 140 may include a shaft 142 having a male member 144 at a top end 146. Further shaft assembly 140 may include a power cable 148 running through shaft 142. Shaft 142 may extend between handle 22 and head 62. It may be suitable for shaft 142 to be telescopic. Importantly, shaft 142 may include a pivot knob 152. Pivot knob 152 may be at a predetermined location on shaft 142. Pivot knob 152 allows shaft 142 to swivel or pivot about pivot knob 152. Shaft 142 may be articulated about pivot knob 152 to help reach more or difficult to access locations. Pivot knob 152 may allow for reaching of areas laterally. Pivot knob 152 may be loosened until shaft 142 is at a desired angle. Subsequently, pivot knob 152 may be tightened to secure the angled position of shaft 142 to allow reaching of areas that are vertical and horizontal as well. Pivot knob 152 allows for a bend or break on shaft 142.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a motorized multi-function tool, comprising:
   a. a handle assembly having a handle housing a battery, said handle further having a power button;
   b. a cover assembly having a head with a first end and a second end, said head having an opening at said first end, said head housing a motor, said head further having a female member extending therefrom, said female member having a first female side and a second female side, said female member having a female opening defined as the space between said first female side and said second female side, said motor having an axle extending therefrom, said axle extending beyond said head through said opening, wherein said cover assembly further includes a fastener, said fastener including a tightening knob at a distal end thereof, said tightening knob allowing for loosening or tightening of said fastener to allow positioning of said head before securing into a desired position by a user;
   c. a rod assembly having a shaft connecting said handle to said head, said shaft extending between said handle and said head, said shaft having a top end with a male member mounted thereon, said male member received by said female opening, said rod assembly further includes a power cable running through said shaft for connecting said battery to said motor for providing power to said motor from said battery, said axle rotating upon said motor being powered, said power button being actuated to turn on and off said motor, said fastener extending through said male member and said female member when said male member has engaged said female member; and
   d. an interchangeable tool assembly including different tool heads, wherein each of said tool heads includes an attaching portion to be received by said axle mounted to said motor for securing of one of said tool heads to said axle to allow the user to use said motorized multi-function tool to accomplish different tasks.

2. The system of claim 1, wherein said battery is rechargeable.

3. The system of claim 2, wherein said handle includes a charging port for charging said battery.

4. The system of claim 1, wherein one of said tool heads is a triangle cutter tool having triangular blades adapted for cutting, said triangle cutter tool includes three of said triangular blades.

5. The system of claim 1, wherein said one of said tool heads is a vacuum tool adapted for suctioning of debris, said vacuum tool includes small bristles thereon for dislodging of debris before suctioning by said vacuum tool, wherein said small bristles are oriented in a star configuration.

6. The system of claim 1, wherein one of said tool heads is a brush tool having bristles thereon adapted for cleaning and scrubbing of surfaces.

7. The system of claim 1, wherein one of said tool heads is a buffer tool adapted to polish surfaces.

8. The system of claim 1, wherein one of said tool heads is a round cutter tool adapted for cutting, wherein said round cutter tool includes a plurality of blades along a circumference thereof to accomplish said cutting.

9. The system of claim 1, wherein one of said tool heads is a twin blade cutter tool adapted for cutting, wherein said twin blade cutter tool includes a circular disk with blades extending along the circumference of said circular disk, said twin blade cutter tool further includes twin blades extending from the circular disk, wherein each of the twin blades are sharp only on one side, said twin blades are oriented opposite one another as said twin blades face away from one another.

10. The system of claim 1, wherein said shaft is telescopic.

11. The system of claim 1, wherein said power cable is housed entirely within said shaft.

12. The system of claim 1, wherein said motor vibrates.

\* \* \* \* \*